(12) United States Patent
Siroker et al.

(10) Patent No.: US 11,397,785 B2
(45) Date of Patent: Jul. 26, 2022

(54) IDENTIFYING DYNAMIC AUDIENCES BASED ON USER INTERESTS

(71) Applicant: Optimizely, Inc., San Francisco, CA (US)

(72) Inventors: Dan Siroker, Palo Alto, CA (US); Whelan Jefferson Boyd, New York City, NY (US); Hao Xia, San Francisco, CA (US); Zachary Leach, San Francisco, CA (US)

(73) Assignee: Optimizely, Inc., San Francisco, CA (US)

( * ) Notice: Subject to any disclaimer, the term of this patent is extended or adjusted under 35 U.S.C. 154(b) by 0 days.

(21) Appl. No.: 16/590,050

(22) Filed: Oct. 1, 2019

(65) Prior Publication Data

US 2020/0233911 A1   Jul. 23, 2020

Related U.S. Application Data

(60) Provisional application No. 62/794,449, filed on Jan. 18, 2019.

(51) Int. Cl.
*G06F 16/9535* (2019.01)
*G06Q 30/02* (2012.01)
*H04L 67/50* (2022.01)

(52) U.S. Cl.
CPC ..... *G06F 16/9535* (2019.01); *G06Q 30/0271* (2013.01); *G06Q 30/0277* (2013.01); *H04L 67/22* (2013.01)

(58) Field of Classification Search
CPC ............ G06F 16/9535; G06Q 30/0271; G06Q 30/0277; H04L 67/22
USPC ........................................................ 707/734
See application file for complete search history.

(56) References Cited

U.S. PATENT DOCUMENTS

| | | | |
|---|---|---|---|
| 9,178,934 B1* | 11/2015 | Kolam | H04L 67/1014 |
| 2008/0126176 A1* | 5/2008 | Iguchi | G06F 16/9535 |
| | | | 705/7.29 |
| 2018/0240152 A1* | 8/2018 | Mookherjee | G06Q 30/0254 |
| 2020/0134401 A1* | 4/2020 | Hurry | G06K 9/78 |
| 2020/0233924 A1* | 7/2020 | George | G06F 40/14 |

* cited by examiner

*Primary Examiner* — Allen S Lin
(74) *Attorney, Agent, or Firm* — Womble Bond Dickinson (US) LLP

(57) ABSTRACT

A browsing history associated with a user of a client device is received from the client device. One or more keywords associated with a target audience for a variant of a web page are received from a content provider system. A score is determined for the user based on the browsing history for the user and the one or more keywords associated with the target audience. The user is identified as part of the target audience based on the score for the user satisfying a score threshold. The variant of the web page is caused to be presented at the client device associated with the user.

14 Claims, 16 Drawing Sheets

Create New Audience

Name

Interested in Finance — 302

Description (Optional) — 304

Audience Conditions   Code Mode ☐ ⓘ

Interest Group                                    ✕

Top 25 % of visitors most interested in [keywords] — 308

Representative visitor views

Audience

Interested in Travel

| timestamp | title |
|---|---|
| 2018-05-17 20:24:31.232 | 1 adult, 1 child killed in 'horrific' accident involving school bus and dump tr |
| 2018-05-17 10:11:35.947 | Untangling Mayanmar's trade in human hair |
| 2018-05-17 10:10:18.704 | Calls for leniency grow for teen who killed her rapist |
| 2018-05-17 10:07:37.099 | Children in abuse case shot with weapons and burned with hot water, prose |
| 2018-05-17 10:06:43.362 | CBS responds to Pauley Perrette's tweets about 'NCIS' and assaults |
| 2018-05-17 10:04:48.542 | US surgeon general says he assisted in medical emergency on Delta flight |
| 2018-05-17 09:59:23.788 | Man threatens to call ICE on people speaking spanish at a restaurant in Ne |
| 2018-05-17 09:37:38.634 | A man who was wrongly convicted of murder when he was 14 clears his na |
| 2018-05-16 21:07:38.854 | A man who was wrongly convicted of murder when he was 14 clears his na |

FIG. 11

IDENTIFYING DYNAMIC AUDIENCES BASED ON USER INTERESTS

CROSS-REFERENCE TO RELATED APPLICATIONS

This application claims the benefit of U.S. Provisional Patent Application No. 62/794,449, filed on Jan. 18, 2019, the disclosure of which is incorporated herein by reference in its entirety.

FIELD OF TECHNOLOGY

The embodiments described herein pertain in general to identifying audiences and more particularly, to identifying dynamic audiences based on user interests.

BACKGROUND

Content variation testing is a type of experiment that tests changes to content against a current version of the content. One example of content variation testing is web page variation testing where an experiment is conducted that tests a web page (or one or more elements on the page) against another design of the web page (or one or more variations of the elements on the page). During variation testing of a web page, user interaction with a web page or its variations is measured (for example, whether a user clicks on a button or a variation of a button), and the effects of the modifications to a web page (or its elements) that produce positive or negative results are determined. The positive results associated with a particular modification to a web page validates that the modification to the web page should be used in a production version of the web page. A variety of internal and external platforms may be used in conjunction for variation testing of a web page.

BRIEF DESCRIPTION OF THE DRAWINGS

FIG. 3 is an illustration of an example of a user interface for a content provider to provide one or more keywords for an audience in accordance with embodiments of the disclosure.

FIG. 11 is an illustration of an example of a user interface presenting frequently visited web pages by users of an audience in accordance with embodiments of the disclosure.

Figure 1:
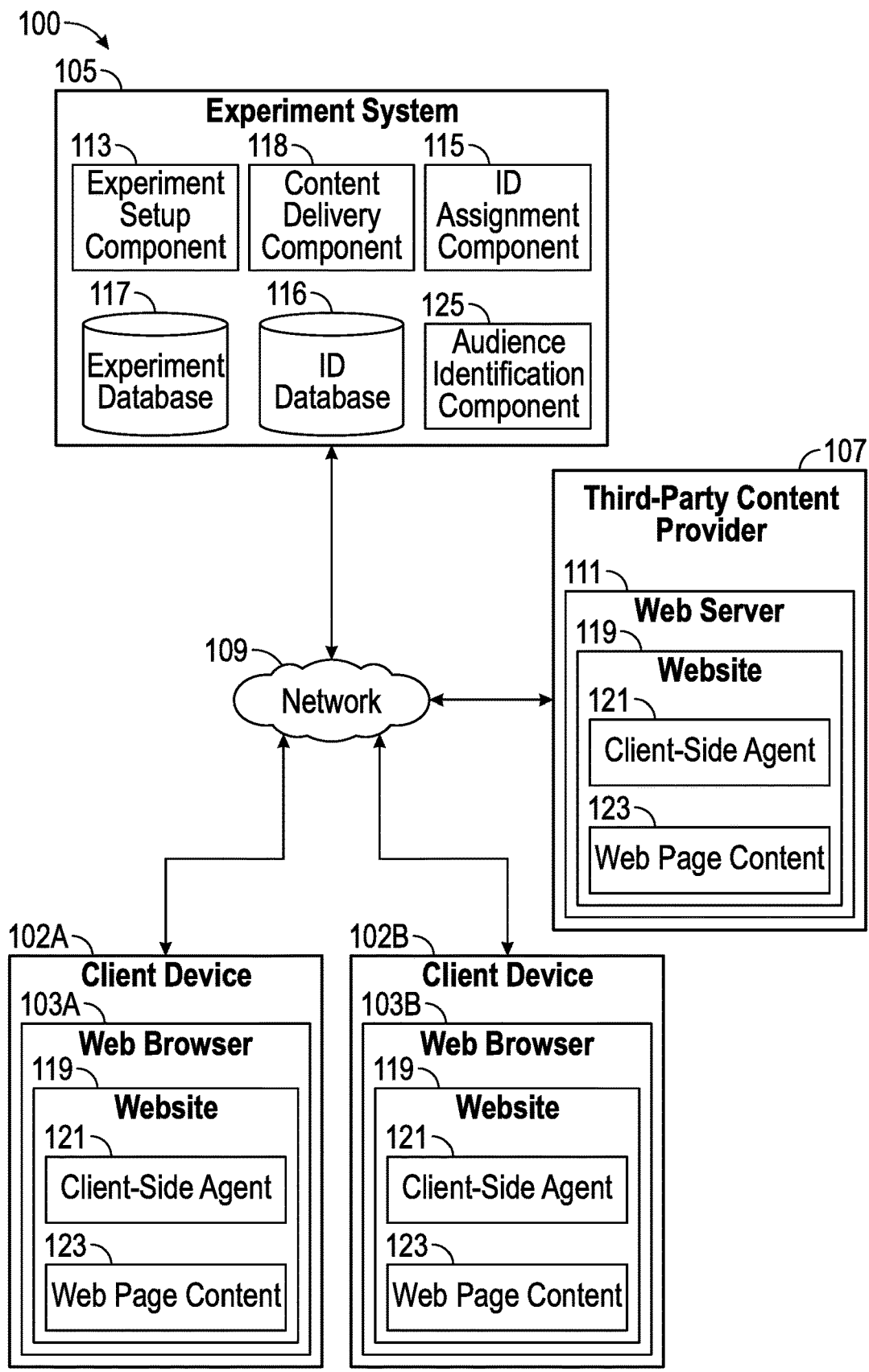
FIG. 1 is a block diagram of a variant testing system environment, according to one embodiment.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Content providers may run content experiments such as A/B tests to answer specific questions regarding which variation of a content item, such as a web page or digital product (including various features), are more successful. Many content experiments include visitor criteria that determine whether a visitor is eligible for the experiment and if so, which variations of the content experiment should be shown to the visitor. The systems that implement these content experiments may be implemented in the backend of the content provider's system or as a separate node that communicates with the back end of the content provider's system. Simultaneously, content providers may bring up content delivery networks (CDNs) in the front-end of their systems to provide for content caching, including caching of content experiment variations.

In some embodiments, a content provider may desire to identify target audiences having shared interests and preferences for particular variations of the content item. For example, a web page may personalize content based on user interests and preferences of a target audience. Personalizing the content of a website provides users consuming the content item with a more positive user experience.

In a conventional experiment system, content providers establish the target audiences for content. However, establishing the audiences requires large amounts of data for a large number of users, making it difficult for content providers to create effective groupings for audiences. Additionally, content providers are required to set up various parameters, rules, threshold, etc. to define the target audience. This is a very time-intensive and tedious process that may be fraught with errors which may result in users being incorrectly grouped into audiences having different interests. If a user is grouped into the wrong audience, the user may receive content that is not relevant to the users' interests or preferences, resulting in a negative user experience.

Advantageously, the methods and systems described herein allow for the automatic identification and dynamic adjustment of audiences based on user interests. In some embodiments, processing logic of an experiment system executes a machine learning algorithm that determines and suggests audiences of users to a content provider based on the users' browsing histories. For example, the experiment system may identify text and/or perform image recognition on web pages previously consumed (e.g., visited) by users.

In embodiments, a content provider provides one or more keywords for a target audience to the experiment system. For example, if a content provider desires a target audience interested in finance, the content provider may provide keywords such as finance, money, monetary, bonds, stocks, etc. Using the keywords for the target audience, the experiment system determines an interest score (also referred to as "score" hereafter) for each user based on the user's browsing history. For example, a machine learning algorithm of the experiment system may determine a score from 0 to 1 that represents a user's interest in finance, where 0 corresponds to a user being least interested in finance and 1 corresponds to a user being most interested in finance.

The experiment system uses the scores to identify a subset of users for the target audience. For example, the experiment system may identify the subset of users has users having interest scored of 0.75 or higher. In some embodiments, the content provider may provide the experiment system with a score threshold for the target audience. For example, the content provider may indicate that the target audience is to consist of users having a score of 0.70 or above.

Upon identifying the target audience, the experiment system may cause a variant of a web page to be presented to the subset of users in the target audience. For example, for a target audience interested in finance, the experiment system may cause a variant of a web page to be presented that includes one or more content items associated with finance.

Accordingly, aspects of the disclosure provide for an improved experiment system by using a machine learning algorithm to automatically and dynamically identify target audiences based on users' browsing histories. The audiences are generated using keywords provided by a content provider without the need to the content provider to establish rules, thresholds, parameters, etc. for the target audience. This results in the content provider spending less time generating and identifying target audiences and minimizes the risk of users being incorrectly classified into a particular audience, thus improving the performance of the experiment system.

FIG. 1 is a block diagram of a variant testing system environment 100 according to one embodiment. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to an experiment system 105 and a third-party content provider 107 via a network 109. In one embodiment, experiment system includes one or more experimentation platforms to configure experiments and/or program management platforms to manage the experiment system. Although the environment 100 shown in FIG. 1 only includes two client devices 102, the environment 100 can include any number of client devices (e.g., thousands of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

The network 109 enables communication among the entities connected to it. In one embodiment, network 109 is the Internet and uses standard communications technologies and/or protocols. Thus, network 109 can include links using technologies such as Ethernet, Wi-Fi (e.g., 802.11), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multiprotocol label switching (NIPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 communicate with the third-party content provider 107 via the network 109 to receive content items such as web pages from the third-party content provider 107. In one embodiment, each client device 102 is a computer system capable of communicating with the experiment system 105 and the third-party content provider 107. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). The web browser 103 is a computer program stored on a client device 102 that allows the user of client 102 to access web pages on the World Wide Web such as websites 119 provided by the third-party content provider 107. Suitable web browsers include, but are not limited to, GOOGLE CHROME, MICROSOFT INTERNET EXPLORER, MICROSOFT EDGE, MOZILLA FIREFOX, and APPLE SAFARI. In addition to web browsers, a client device may process a web page in an environment like NODE.JS, in which an experiment system and other third-party content providers may execute JavaScript code in an interpreter with support for microtask and macrotask queues.

As mentioned above, the environment 100 includes a third-party content provider 107. Hereinafter, the third-party content provider 107 is referred to as a "content provider 107" for ease of description. The content provider 107 may be an individual, a group of individuals, or an entity such as a company. In one embodiment, the content provider 107 provides content items to client devices 102. While only one content provider 107 is shown, it is understood that any number of content providers are supported and can be in the environment 100 at any time.

In one embodiment, the content items provided by the content provider 107 are included as part of a website 119.

For example, the content provider 107 may provide content items such as navigation bars, backgrounds, call to action buttons, links, CSS styles, pop-ups, video, audio, a combination of video and audio, still images (e.g., JPEG), text documents, advertisements, and/or any other types of content. For purposes of convenience and the description of one embodiment, the content items provided by the content provider 107 will be referred to as a single-page web pages, but no limitation on the type of content items are intended by this terminology. In one embodiment, a single-page web page refers to a view of a website 119. For example, a single-page web page may be the initial view of a website 119 when the user first loads the website 119 or the view when the user navigates over a navigation bar element and a menu is displayed in response to the navigation over the navigation bar. In other embodiments, a single-page web page may refer to any other type of dynamic website or dynamic application.

In one embodiment, the content provider 107 operates in conjunction with the experiment system 105 to perform variation testing on a website 119 containing one or more single-page web pages. In one embodiment, the content provider 107 sends a single-page web page to client devices 102 together with a client-side experimentation agent 121, which includes or subsequently downloads from the experiment system 105 conditions and instructions for modifying the single-page web page. A variation test for a single-page web page of a website 119 tests changes to the single-page web page against the current variation of the single-page web page (e.g., the original version of the single-page web page) to determine how the variation alters user interaction with the web page or whether the changes produce a desired result. An example of a desired result resulting from a change to a single-page web page is an increased interaction with the web page such as an increased selection of an advertisement(s) included in the single-page web page or increased purchases of a product advertised on a single-page web page. Thus, variation testing validates a new design of a single-page web page or changes on elements on the single-page web page before the new design or changes are put into production by the content provider 107.

For a given single-page web page, the content provider 107 may have an associated smart page that includes one or more variations of the single-page web page that are used in a variation test for the single-page web page. In one embodiment, a variation test of a single-page web page involves an experiment that tests control "A" and a variation "B" on users requesting the single-page web page from the content provider 107. For ease of discussion, the embodiments discussed herein describe a web page having only two variations: the control and the variant. However, in other embodiments, a single page web page can have any number of variations.

Figure 2:
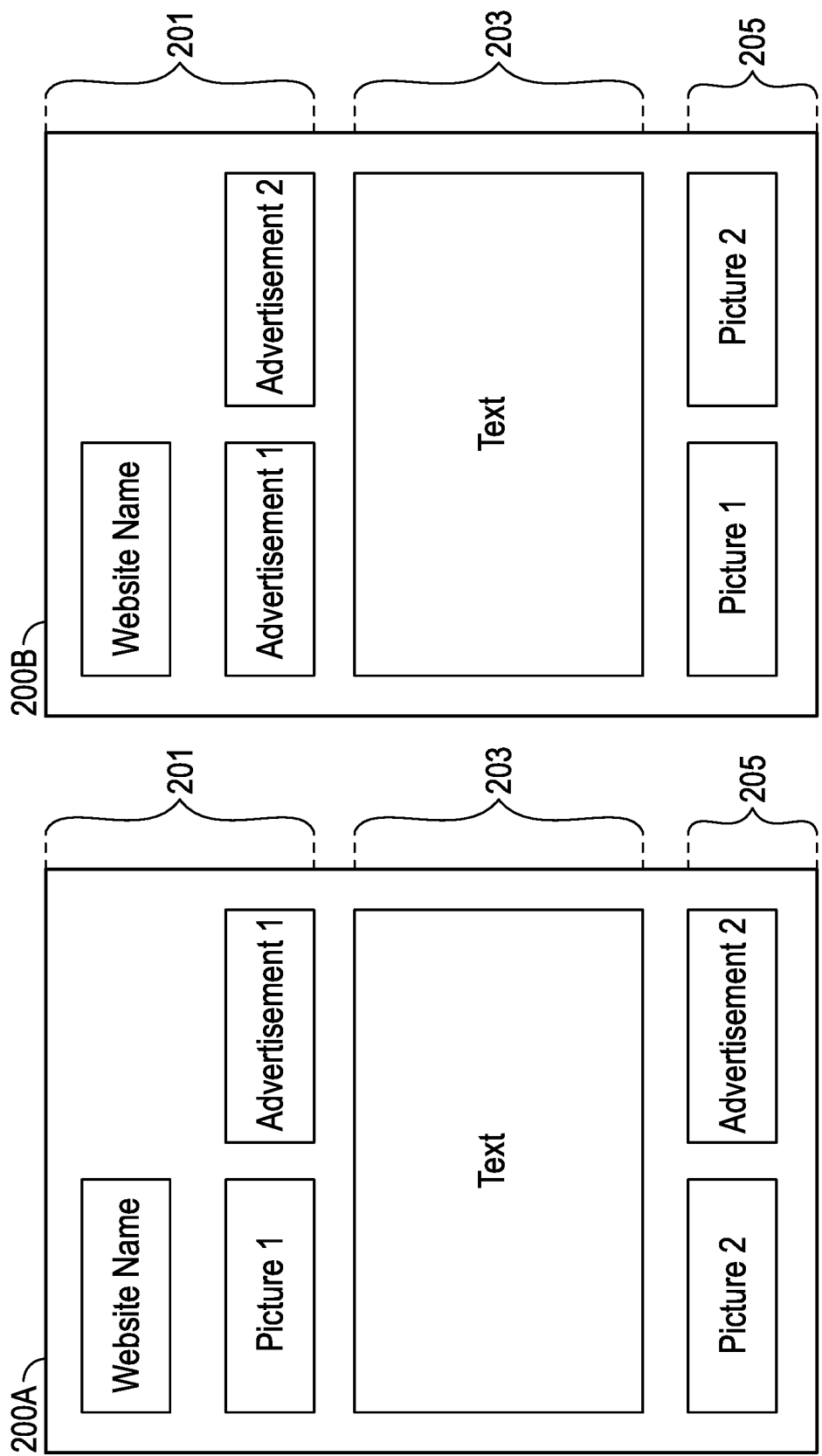
FIGS. 2A and 2B are example variations of a web page, according to one embodiment.

FIG. 2A is an example of an "A" variation (e.g., the control variation) of a web page 200A that represents the current implementation of the web page provided by content provider 107. The control variation of the web page 200A includes a website name of the website associated with the web page, a first picture, and a first advertisement. The website name, the first picture, and the first advertisement are located in an upper portion 201 of the control variation of web page 200A according to one embodiment. The control variation of web page 200A also includes textual content located in a central portion 203 of the control variation of web page 200A and the control variation of the web page 200A also includes a second picture and a second advertisement located at a lower portion 205 of the control variation of the web page 200A.

FIG. 2B is an example of a "B" variation (e.g., the variant version) of a web page e 200B. The variant version of the web page represented by web page 200B includes a change (i.e., a modification) to the control version of the web page 200A shown in FIG. 2A. The variant version of web page 200B includes the website name, a first advertisement, a second advertisement, textual content, a first picture, and a second picture similar to the control version of the web page 200A shown in FIG. 2A. However, the variant version of web page 200B includes the second advertisement positioned in the upper portion 201 of web page 200B whereas the second advertisement is positioned in the lower portion 205 in the control version of the web page 200A. In one embodiment, the variation test using the control version and the variant version of the web page is conducted to determine whether the second advertisement receives more selections when the second advertisement is located at the lower portion 205 of the web page as shown in FIG. 2A or when the second advertisement is located at the upper portion 201 of the web page as shown in FIG. 2B.

Referring back to FIG. 1, in one embodiment the content provider 107 includes a web server 111. In one embodiment, the web server 109 links the content provider 107 to one or more client devices 102 and the experiment system 105 via the network 109. The web server 111 serves websites 119, as well as other web related content 123 for the website 119, such as Java, Flash, XML, and so forth. The web server 111 may include a mail server or other messaging functionality for receiving and routing messages between the experiment system 105 and one or more client devices 102. In one embodiment, a website 119 provided by the web server 109 may include a client-side experimentation agent 121. The client-side experimentation agent 121 may be added to the website 119 by the third-party content provider 107 in one embodiment. The client-side experimentation agent 121 includes code that loads experiment variation instructions from the experiment system 105.

In some embodiments, the client-side experimentation agent 121 may include code to cause client devices 102 to perform at least one of identifying text presented on website 119 or performing image recognition on one or more images presented on website 119. The client-side experimentation agent 121 may also include code that causes client devices 102 to provide browsing history to the experiment system 105. For example, the client-side experimentation agent 121 may cause client devices 102 to transmit the identified text and/or results of the image recognition from website 119 to the experiment system 105.

As shown in FIG. 1, the variant testing system environment 100 also includes an experiment system 105. In one embodiment, the experiment system 105 establishes and conducts variation experiments for web pages included in websites 119 served by third party providers 107. In one embodiment, the experiment system 105 includes an experiment setup component 113, an ID assignment component 115, an ID database 116, an experiment database 117, a content delivery component 118, and an audience identification component 125, according to one embodiment. As is known in the art, the term "component" refers to computer program logic utilized to provide the specified functionality. Thus, a component can be implemented in hardware, firmware, and/or software. In one embodiment, components are stored on a non-transitory storage device (i.e., a computer program product), loaded into a memory, and executed by one or more computer processors. Additionally, those of skill in the art will recognize that other embodiments of the experiment system 105 shown in FIG. 1 can have different and/or other components than the ones described here, and that the functionalities can be distributed among the components in a different manner.

In embodiments, the audience identification component 125 may automatically and dynamically generate audiences for variants of a web page. The audience identification component 125 may include one or more machine learning algorithms trained to automatically and dynamically generate the audiences. The audience identification component 125 may receive one or more keywords for an audience from the third-party content provider 107. The audience identification component 125 may receive browsing history from the client devices 102. In embodiments, the audience identification component 125 may receive browsing history from the third-party content provider 107. The audience identification component 125 may identify content presented in web pages included in the browsing history that were previously consumed by users of the client devices 102. For example, the audience identification component may identify text and/or perform image recognition on content presented on web pages consumed by the users. The audience identification component 125 may determine an interest score for users of client devices 102 based on the browsing histories received from the client devices 102. The audience identification component 125 may identify a subset of users of client devices 102 that correspond to the audience for the variant of the web page using the interest score.

In embodiments, the audience identification component 125 determines the user's interest score by using natural language processing techniques, such as word embeddings. Word embeddings are a form of natural language processing models that represent text with a vector of a real number that has an associated directionality. The word embeddings may be used by the audience identification component 125 to determine the users' interest scores. The user's interest scores may correspond to a numerical value that represents the proximity/relation of a particular word or words to one or more keywords provided for a target audience. In some embodiments, a machine learning algorithm of the audience identification component 125 may train word embeddings for content provided by a particular content provider, resulting in content provider specific word embeddings. Examples of word embeddings that may be used include, but are not limited to, Word2vec, GloVe, fastText, Gensim, Indra, etc.

In some embodiments, the audience identification component 125 may dynamically update the interest scores for users as the users' interest change. In embodiments, the audience identification component 125 may determine a new interest score for a user each time a user visits a determined number of web pages. For example, the audience identification component 125 may determine a new interest score for a user each time the user visits one, two, three, etc. web pages. In some embodiments, the audience identification component 125 may determine a new interest score for a user after an amount of time has elapsed. For example, the audience identification component 125 may determine a new interest score for a user after 24 hours of time has elapsed. By updating the interest score for a user, the interest score is more likely to accurately reflect a user's current interests as the user's interests change over time.

In embodiments, the audience identification component 125 may maintain multiple interest scores for different audience categories. For example, a user may have a first interest score for furniture and a second interest score for kitchen supplies. If the user initially visits several sofa product pages, the first interest score for furniture may increase, while the second interest store for kitchen supplies may decrease. However, if the user then views several pages for kitchen appliances, the first interest score for furniture may decrease, while the second interest score for kitchen supplies may increase.

In one embodiment, the experiment setup component 113 establishes experiments for websites 119 provided by the third-party content provider 107. The experiment setup component 113 receives input from an affiliate (e.g., an employee) of the third-party content provider 107 to establish a variation experiment for a single-page web page of a website 119 provided by the third-party content provider 107. In one embodiment, establishing a variation experiment for a single-page web page of a website 119 includes configuring a smart page for the single-page web page. In one embodiment, a smart page for a single-page web page is a set of instructions that describe when to activate a variation experiment associated with the single-page web page. The smart page may include one or more triggers and one or more conditions configured by the affiliate of the third-party content provider 107 that impact when variations of the associated single-page web page are selected and presented to a client device 102.

A smart page for a single-page web page may define one or more conditions. In one embodiment, a condition(s) for a smart page is a set of rules related to the state of the single-page web page that must be satisfied before the smart page for the single-page web page will activate. That is, a condition of a smart page describes the state of the world of the single-page web page that can be evaluated as true (i.e., valid) or false (i.e., invalid). Responsive to a condition being true, a smart page causes the performance of a specified action. For example, information included in the smart page specifies when and how to present experimental variants of the website 119 to viewing users if a condition in the smart-page is true. If a condition is false, the smart page may be deactivated if the smart page is currently active or the smart page may not be activated if not currently activated.

In one embodiment, a smart page for the single-page web page may also include at least one trigger. In one embodiment, a trigger defines when to evaluate the condition(s) for the smart page. That is, a trigger of a smart page is tied to an event on the single-page web page and signals a client device 102 to evaluate conditions associated with the trigger. Smart pages may include one or more triggers that can be of different trigger types. When a trigger event occurs, the smart page evaluates the corresponding conditions associated with the trigger event.

FIG. 3 is an illustration of an example of a user interface 300 for a content provider to provide one or more keywords for an audience in accordance with embodiments of the disclosure. The user interface 300 may include a name text field 302, a description text field 304, a parameter text field 306 and a keyword text field 308. In embodiments, the user interface 300 may be generated by experiment system 105 and transmitted to content provider 107 for presentation by a computing device of the content provider 107. For example, the user interface 300 may be generated by experiment system 105 and presented via a web browser of a computing device of the content provider 107. In some embodiments, the user interface 300 may be included in an application executed by a computing device of content provider 107.

Upon presenting the user interface 300 to the content provider, the content provider may provide inputs in the name text field 302, the description text field 304, the parameter text field 306 and/or the keyword text field 308 based on a desired target audience. The content provider may provide a name for the target audience via the name text field 302. For example, the content provider may name the target audience "Interested in Finance." The content provider may provide a description of the target audience via the description text field 304. For example, the content provider may input information describing one or more demographics of the target audience. The content provider may provide one or more parameters for the target audience via the parameter text field 306. For example, the content provider may indicate that the target audience is to include the top 25% of users interested in the keywords provided for the desired target audience based on a calculated interest score. The content provider may provide one or more keywords for the target audience via the keyword text field 308. For example, the content provider may input keywords such as finance, money, stocks, bonds, etc. for a target audience that is interested in finance. Upon entering the information into the name text field 302, the description text field 304, the parameter text field 306 and/or the keyword text field 308, the information may be transmitted to the experiment system.

Figure 4:
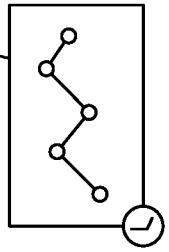
FIG. 4 is an illustration of an example of a user interface indicating that a target audience is being identified in accordance with embodiments of the disclosure.

FIG. 4 is an illustration of an example of a user interface 400 indicating that a target audience is being identified in accordance with embodiments of the disclosure. Upon receiving the information associated with the target audience, as previously described at FIG. 3, the experiment system may initiate the process of identifying users to be included in the target audience. For example, a machine learning algorithm executed by a processing device of the experiment system may initiate the process of identifying the users based on an interest score that is determined using the users' browsing histories. The process of identifying the users for the target audience may take a determined amount of time from the receipt of the information for the target audience. Accordingly, the user interface 400 may provide an indication 402 to the content provider that the audience is being processed.

Figure 5:
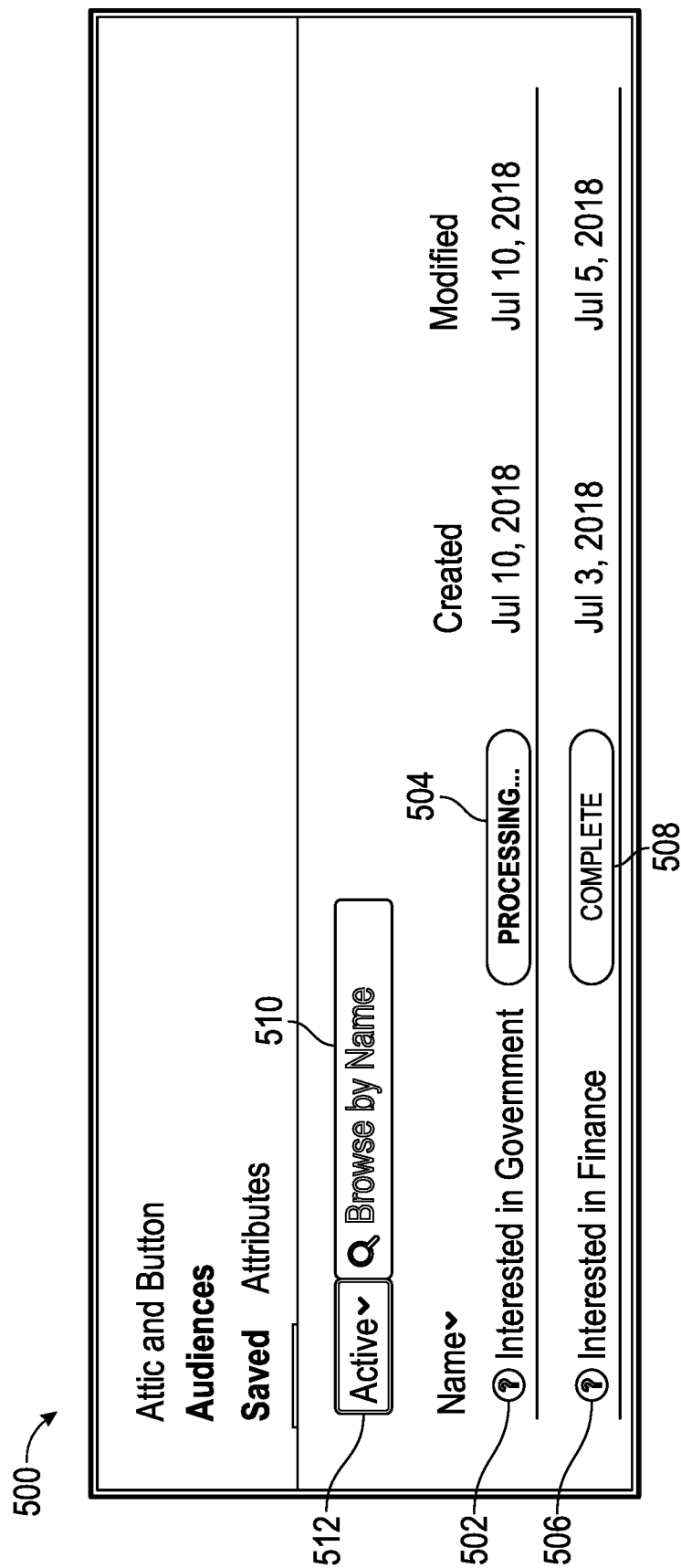
FIG. 5 is an illustration of an example of a user interface for managing multiple audiences in accordance with embodiments of the disclosure.

FIG. 5 is an illustration of an example of a user interface 500 for managing multiple audiences in accordance with embodiments of the disclosure. In some embodiments, a content provider may create and manage multiple audiences. For example, a content provider may create a first audience interested in a first set of keywords and a second audience interested in a second set of keywords. User interface 500 may provide a listing of audiences created by a content provider as well as information associated with the audiences.

Referring to FIG. 5, the user interface 500 includes a first audience 502 that is interested in government and a second audience 506 that is interested in finance. The first audience 502 includes a status indicator 504 that indicates the status of the first audience 502. The status indicator 504 indicates to the content provider that the experiment system is currently processing the first audience 502. The second audience 506 includes a status indicator 508 that indicates the status of the second audience 506. The status indicator 508 indicates that the experiment system has completed the processing of the second audience 506. In embodiments, the user interface 500 may include other information associated with the first audience 502 and the second audience 506. For example, the user interface 500 may include corresponding creation and modification dates for the first audience 502 and the second audience 506. In an embodiment, other information associated with the first audience 502 and the second audience 506 may be presented within user interface 500.

In some embodiments, the user interface 500 may include a search bar 510 and/or filters 512 that may be used be a content provider to locate one or more audiences from the list of audiences. The content provider may input text associated with the one or more audiences into the search bar 510 and the experiment system may query the list of audiences and present audiences relevant to the text within the user interface 500. The content provider may also provide one or more filters 512 that can be applied to the list of audiences presented within the user interface 500. For example, the content provider may select a filter 512 that specifies only active audiences be presented within user interface 500.

Figure 6:
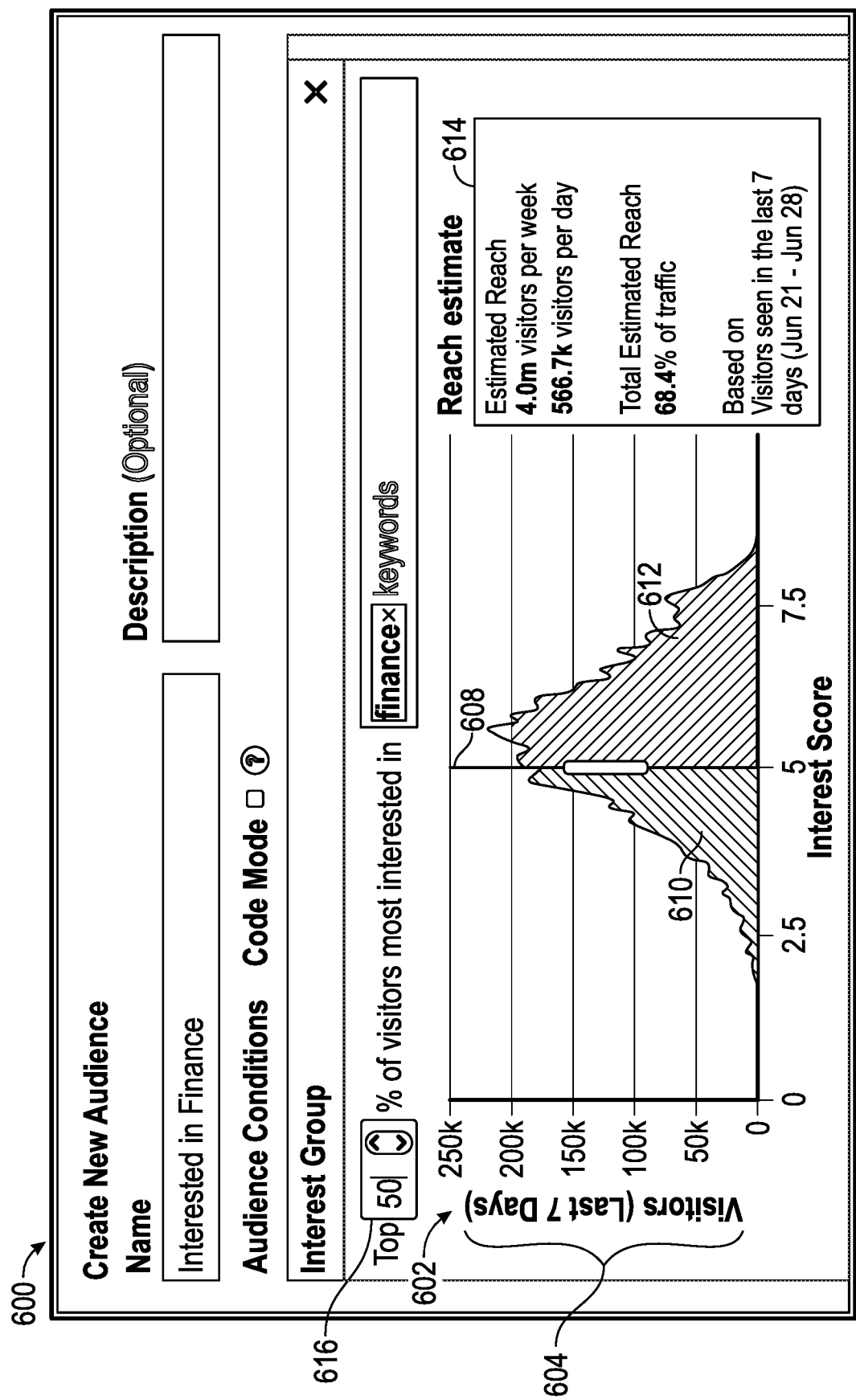
FIG. 6 is an illustration of an example of a user interface including a graphical representation of interest scores of users for an audience in accordance with embodiments of the disclosure.

FIG. 6 is an illustration of an example of a user interface 600 including a graphical representation of interest scores of users for an audience in accordance with embodiments of the disclosure. As previously described, upon receiving one or more keywords for an audience from a content provider, the experiment system may calculate a corresponding interest score for each user of a group of users based on each user's browsing history. The score for each user may correspond to a numerical representation of the user's interest in a particular subject. In embodiments, the score may range from 0 to 1, where a user having a score of 0 may be least interested in the subject and a user having a score of 1 may be most interested in the subject. The user interface 600 may include a graphical representation 602 that illustrates the distribution of interest scores for a particular audience.

Referring to FIG. 6, the graphical representation 602 is a graph having a Y-axis corresponding to a number of users 604 and an X-axis corresponding to a calculated interest score 606. In embodiments, the graphical representation 602 may include an interactive element 608 that enables a content provider to dynamically adjust the size/number of users assigned to the audience. The interactive element 608 may be a slider that a content provider can select and move along the X-axis to adjust the size of the audience. For example, if a content provider desires to increase the size of the audience, the content provider may slide the interactive element 608 to the left along the X-axis. If the content provider desires to decrease the size of the audience, the content provider may slide the interactive element 608 to the right along the X-axis. Users having an interest score that corresponds to the first area 610 to the left of the interactive element 608 may not be included in the audience, while users having an interest score that corresponds to the second area 612 to the right of the interactive element 608 may be included in the audience.

In some embodiments, the user interface 600 may include statistics 614 associated with the audience. For example, the statistics 614 may present estimated reach values that correspond to a number of users that may interact with/consume content associated with the audience. As the content provider adjusts the size of the audience, the experiment system may determine new statistics 614 for the adjusted audience and present the new statistics 614 within the user interface 600.

In embodiments, the user interface 600 may include a parameter text field 616 to enable a content provider to dynamically adjust the size of the audience. Rather than using interactive element 608 to adjust the size of the audience, the content provider may input a new value in the parameter text field 616 to adjust the size of the audience. For example, if a content provider desired to increase the size of an audience including the top 25% of users most interested in finance, the content provider may input a new value of 50% in the parameter text field 616. Upon inputting the value in the parameter text field 616, the graphical representation 602, the interactive element 608 and/or the statistics 614 may be updated to correspond to the adjusted audience.

Figure 7:
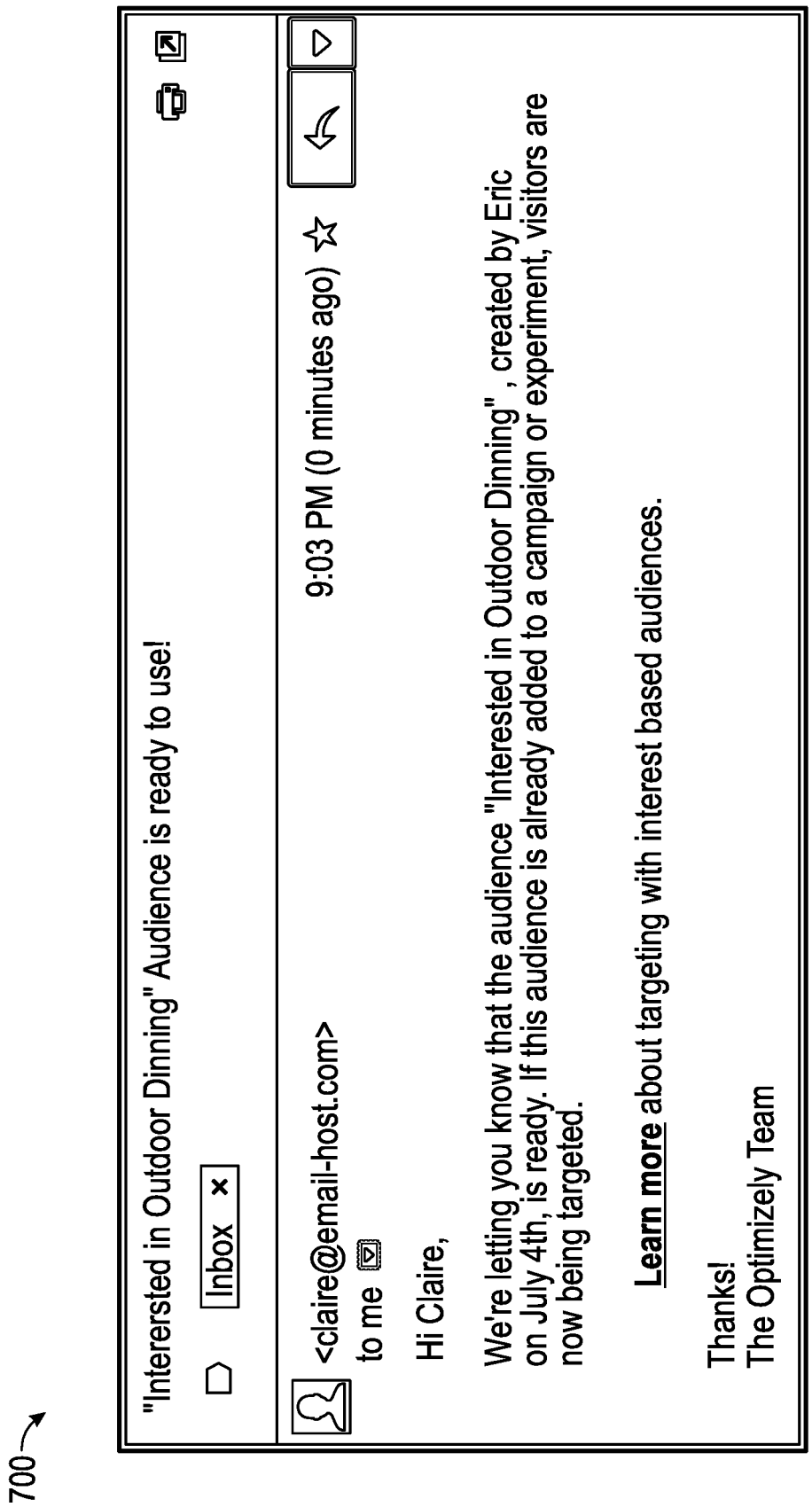
FIG. 7 is an illustration of an example notification provided by the experiment system to the content provider in accordance with an embodiment of the disclosure.

FIG. 7 is an illustration of an example notification 700 provided by the experiment system to the content provider in accordance with an embodiment of the disclosure. In some embodiments, upon completion of the processing of an audience by the experiment system, the experiment system may generate and transmit a notification 700 to the content provider. The notification 700 may include an identification of an audience and indicate that the audience has been created. Examples of notifications that may be generated and transmitted by the experiment system include, but are not limited to, e-mails, short message service (SMS) texts, phone calls or push notifications.

Figure 8:
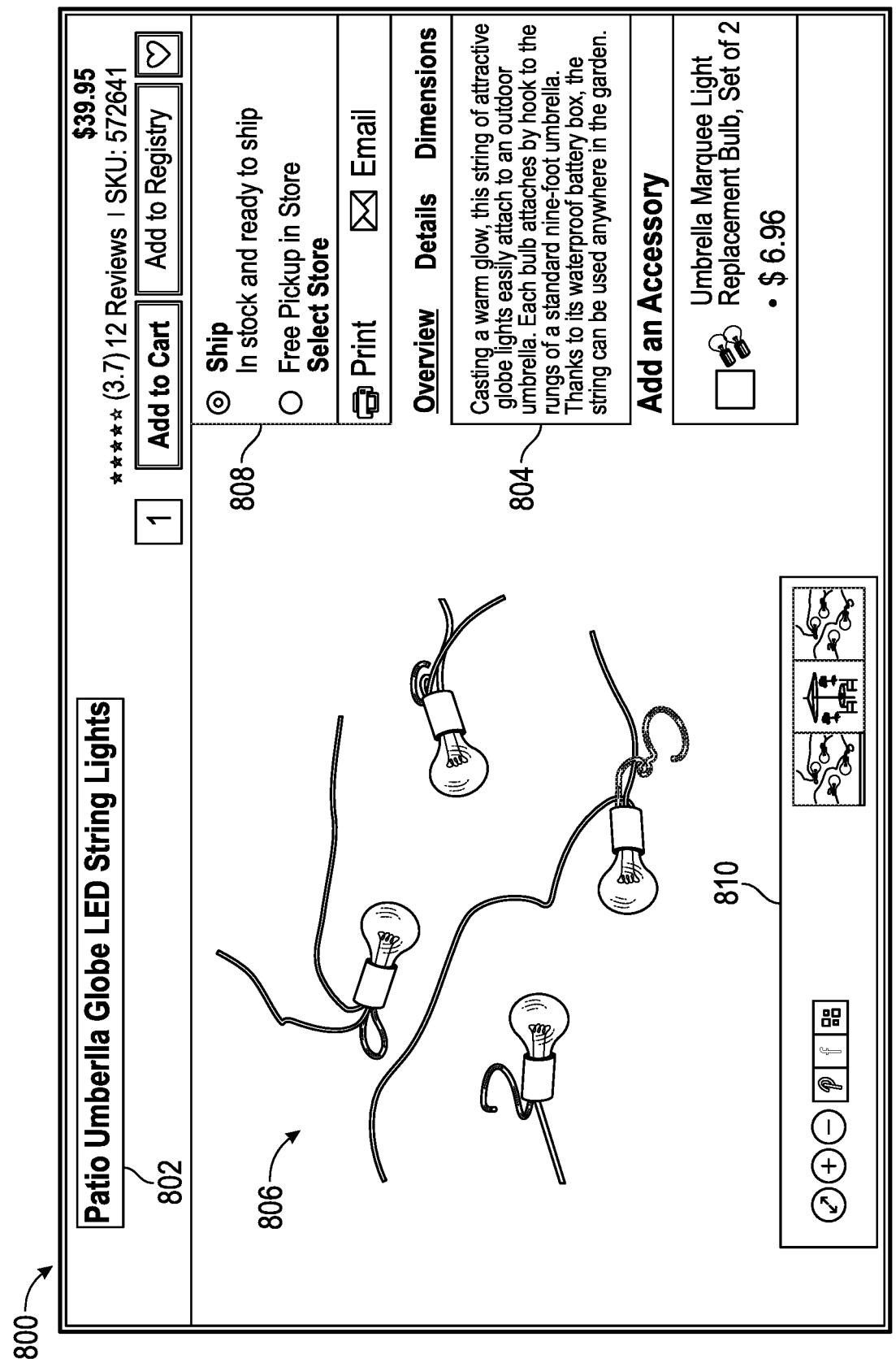
FIG. 8 is an illustration of generating browsing history for a web page in accordance with embodiments of the disclosure.

FIG. 8 is an illustration of generating browsing history for a web page 800 in accordance with embodiments of the disclosure. As previously described, the experiment system may calculate an interest score for each user based on a browsing history of the user. The browsing history may include one or more web pages consumed/visited by the user. Each of the web pages may include one or more content items, such as text, images, audio, etc. that may be consumed by the user.

Content items presented by web page 800 include text 802 and 804 and image 806. In embodiments, upon receiving a user's browsing history, the experiment system may identify relevant text presented on web page 800 that may be used for determining a user's interests or preferences. For example, the experiment system may identify text 802 that corresponds to the name of a product presented by web page 800 and text 804 that corresponds to a description of the product as relevant text for determining a user's interests and preferences. Accordingly, text 802 and text 804 may be used by the experiment system when calculating the user's interest score.

In some embodiments, the experiment system may perform image recognition on images presented on web page 800. The experiment system may identify relevant images presented on web page 800 that may be used for determining a user's interests or preferences. For example, upon performing image recognition on web page 800, the experiment system may identify image 806 that corresponds to an image of the product of web page 800 as being relevant for determining a user's interests or preferences. Accordingly, the results of performing the image recognition of image 806 may be used by the experiment system when calculating the user's interest score.

In embodiments, the experiment system may perform audio recognition on audio files (not shown) presented on web page 800. The experiment system may identify relevant audio presented on web page 800 that may be used for determining a user's interests or preferences. For example, upon performing audio recognition on web page 800, the experiment system may identify a particular song or words/phrases within the audio file that may be used to determine a user's interests or preferences. Accordingly, the results of performing the audio recognition may be used by the experiment system when calculating a user's interest score.

In embodiments, the experiment system may identify text, images and/or audio that is not relevant to determining a user's interests or preferences. For example, web page 800 may include text 808 and images 810. Text 808 corresponds to delivery options for an item, copyright language, various actions that may be performed (e.g., print, email, add to cart, etc.) that may not be relevant in determining a user's interests or preferences. Images 810 correspond to social media platforms that web page 800 may be shared to, display options for web page 800, etc. that may not be relevant in determining a user's interests or preferences. Accordingly, the experiment system may determine to not use these content items when determining a user's interest score.

Figure 9:
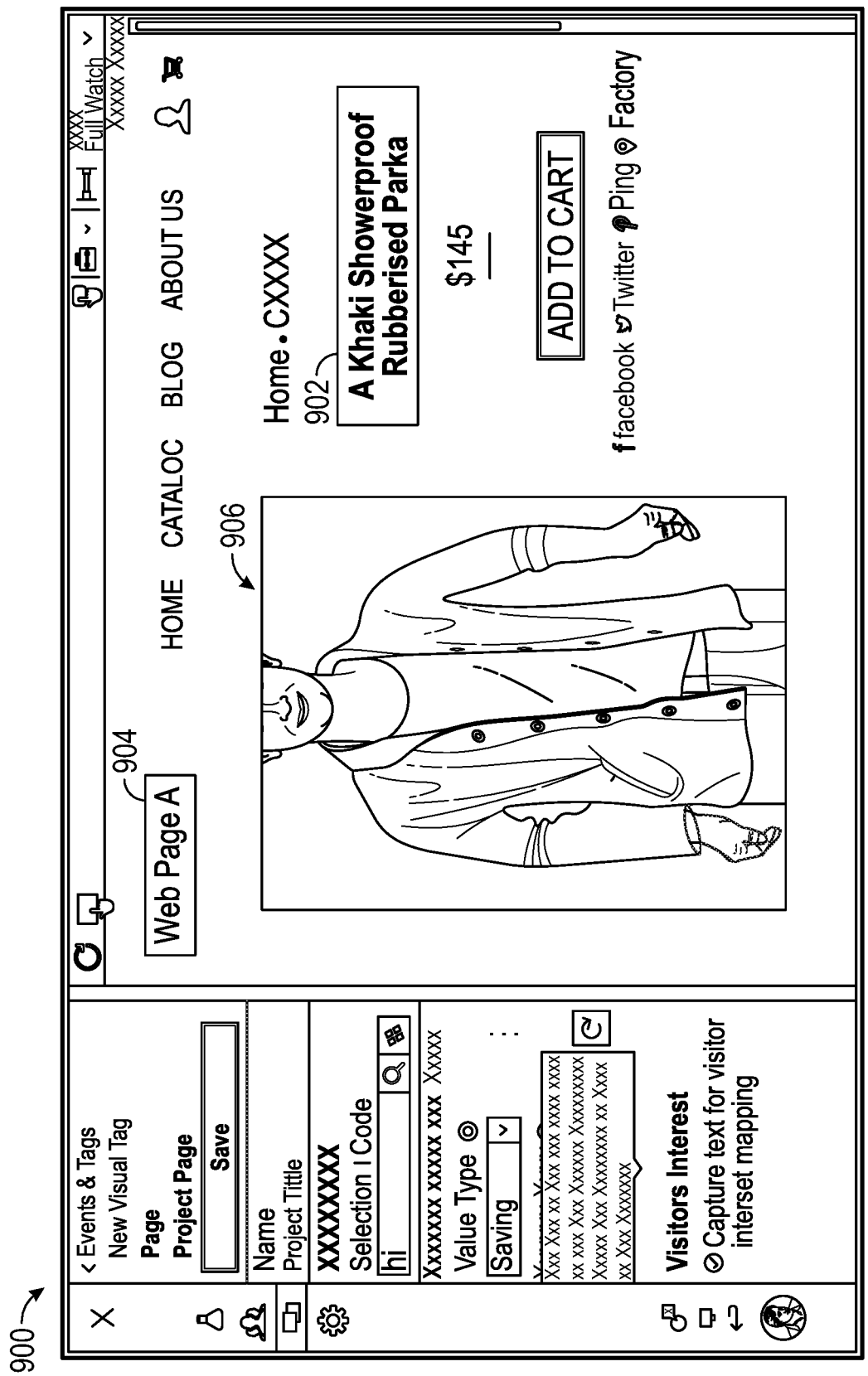
FIG. 9 is an illustration of an example of a content provider indicating content items of a web page to be utilized in determining a user's interest score via a user interface in accordance with embodiments of the disclosure.

FIG. 9 is an illustration of an example of a content provider indicating content items of a web page to be utilized in determining a user's interest score via a user interface 900 in accordance with embodiments of the disclosure. In some embodiments, to prevent content items that are not relevant to a user's interests from being used by the experiment system, a content provider may indicate which particular content items of a web page are to be used by the experiment system. For example, a content provider may select one or more content items of a web page to be used by the experiment system via a user interface.

Referring to FIG. 9, a user interface 900 including a web page is presented to a content provider. The content provider may then select content items presented in the web page via the user interface 900 that are to be used by the experiment system when determining a user's interest score. For example, the content provider may select text 902 that corresponds to a name of a product of the web page and text 904 that corresponds to the title of the web page for use by the experiment system. The content provider may also select image 906 that corresponds to an image of the product for use by the experiment system.

In some embodiments, the experiment system may automatically identify content items without a content provider selecting the content items. For example, a machine learning algorithm executed by the experiment system may be trained to identify relevant content items of a web page to be used for determining a user's interest score.

Figure 10:
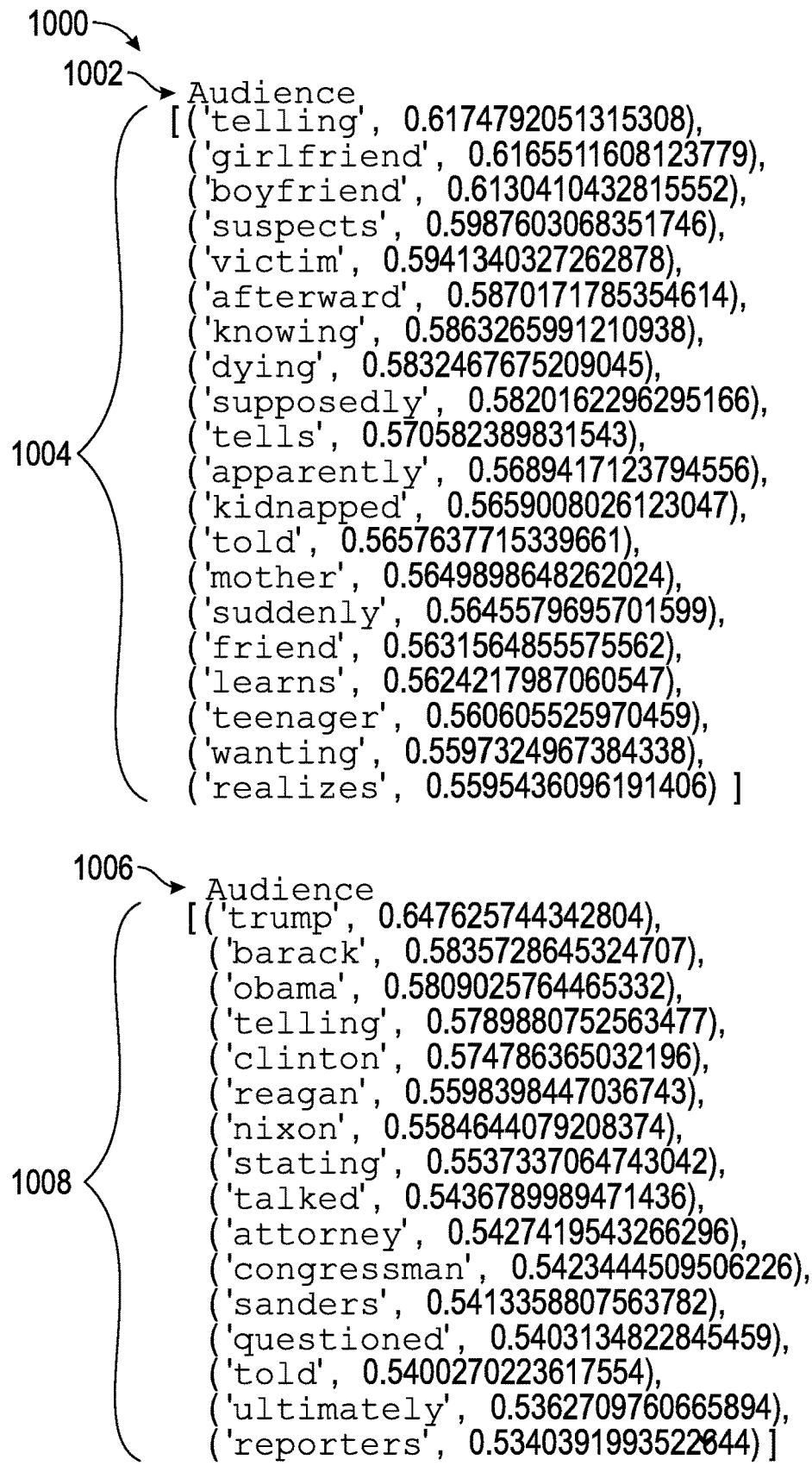
FIG. 10 is an illustration of a user interface presenting keywords associated with audiences identified by an experiment system in accordance with embodiments of the disclosure.

FIG. 10 is an illustration of a user interface 1000 presenting keywords associated with audiences identified by an experiment system in accordance with embodiments of the disclosure. In embodiments, the experiment system may generate audiences from a group of users without receiving keywords/input from a content provider. The experiment system may use the browsing histories of the group of users to identify the different audiences. For example, based on the browsing histories of the group of users, the experiment system may identify 10 audiences having different associated interests (e.g., news, finance, crime, etc.). The experiment system may also identify one or more keywords most frequently consumed by users of the audiences. In some embodiments, the content provider may provide a number of audiences to be generated by the experiment system. For example, the content provider may provide an input to the experiment system indicating that 10 audiences are to be generated by the experiment system.

In some embodiments, the experiment system may generate audiences by grouping users of an audience based on a seed or description of a target audience. For example, a content provider may provide a seed or description of a target audience that is written in plain language to the experiment system. The experiment system may then match user histories with the language provided by the content provider that describes the target audience.

Referring to FIG. 10, the user interface 1000 includes audience 1002 and audience 1006 generated by the experiment system based on the browsing histories of a group of users. The user interface 1000 also includes keywords 1004 and keywords 1008 that correspond to the most frequently presented keywords for audience 1002 and audience 1006, respectively. In embodiments, each keyword from keywords 1004 and keywords 1008 may include a numerical value that represents the frequency each keyword is presented in content items consumed by the group of users.

FIG. 11 is an illustration of an example of a user interface 1100 presenting frequently visited web pages by users of an audience in accordance with embodiments of the disclosure. In embodiments, the experiment system 1100 may generate a user interface 1100 that includes a listing of web pages 1102 that are most frequently visited by users of a particular audience. For example, the user interface 1100 may include a listing of web pages 1102 that are most frequently visited by an audience that is interested in travel. In embodiments, the listing of web pages 1102 may also include timestamps, indicating when the users of the audience are visiting the web pages 1102. In some embodiments, other information associated with web pages 1102 may be presented in user interface 1100.

Figure 12:
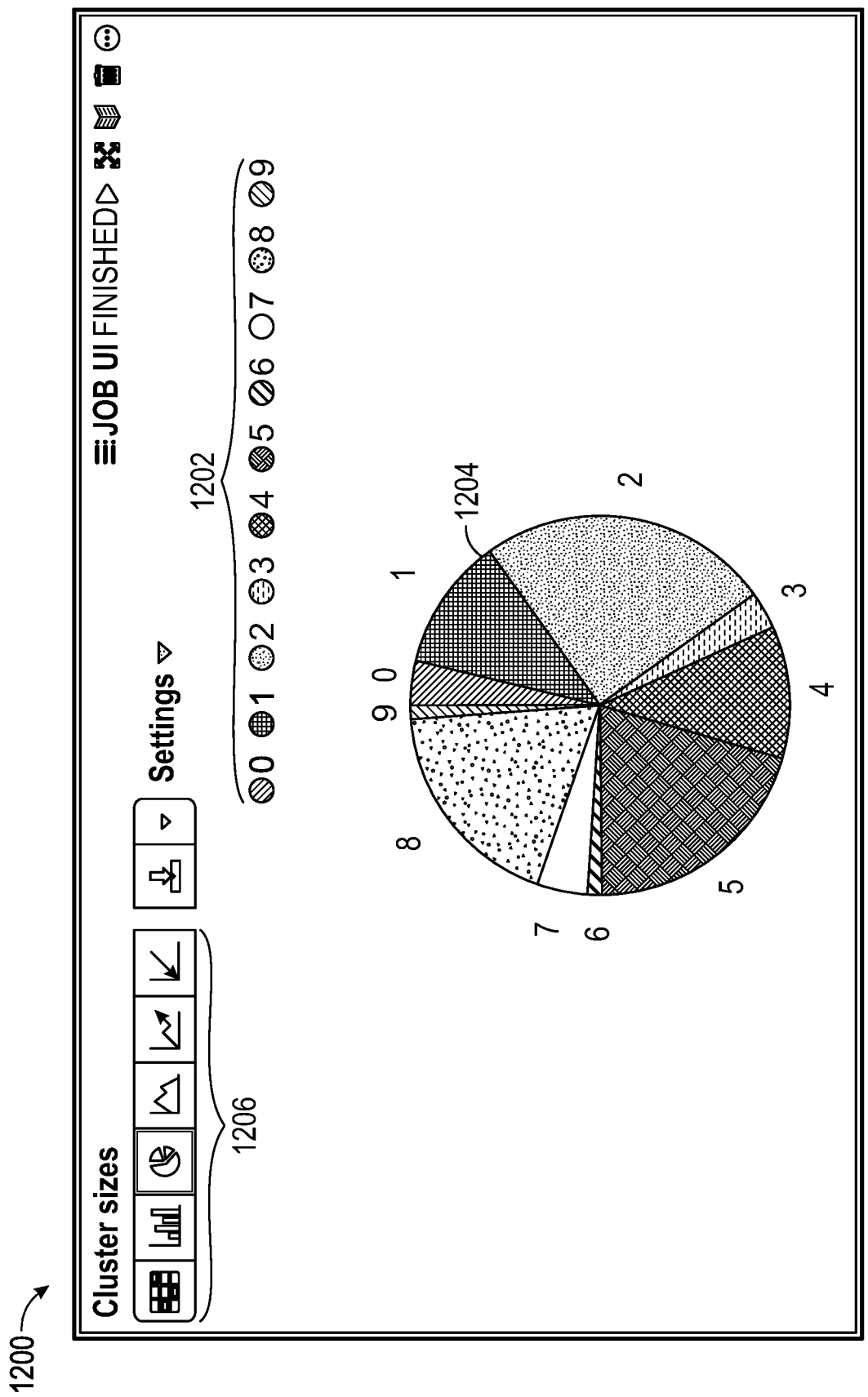
FIG. 12 is an illustration of a user interface that includes a graphical representation corresponding to a number of users assigned to audiences in accordance with embodiments of the disclosure.

FIG. 12 is an illustration of a user interface 1200 that includes a graphical representation corresponding to a number of users assigned to audiences in accordance with embodiments of the disclosure. In embodiments, the experiment system may generate a graphical representation 1204 that corresponds to a number of users assigned to audiences 1202. The user interface 1200 may be presented to a content provider to enable a content provider to determine which audiences have the greatest and/or least number of users. In some embodiments, the user interface 1200 may include icons 1206 that may be selected by a content provider to cause the presentation of other types of graphical representations, such as bar charts, line graphs, histograms, spreadsheets, etc.

Figure 13:
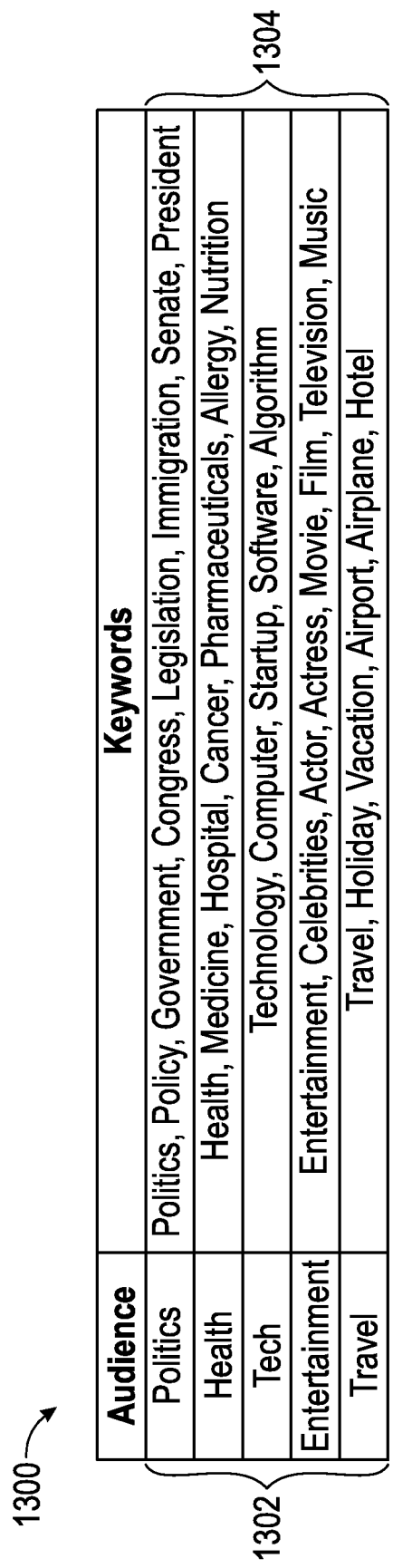
FIG. 13 is an illustration of an example of a user interface that identifies keywords associated with audiences generated by an experiment system in accordance with embodiments of the disclosure.

FIG. 13 is an illustration of an example of a user interface 1300 that identifies keywords associated with audiences generated by an experiment system in accordance with embodiments of the disclosure. The user interface 1300 includes a listing of audiences 1302 previously generated by the experiment system, as previously described. The user interface 1300 may also include suggested keywords 1304 for each of the audiences 1302.

In embodiments, the keywords 1304 may be utilized by a content provider when providing keywords for a target audience. For example, if a content provider desired to create a target audience interested in politics, the content provider may select and provide one or more of the keywords 1304 for identifying a target audience interest in politics.

Figure 14:
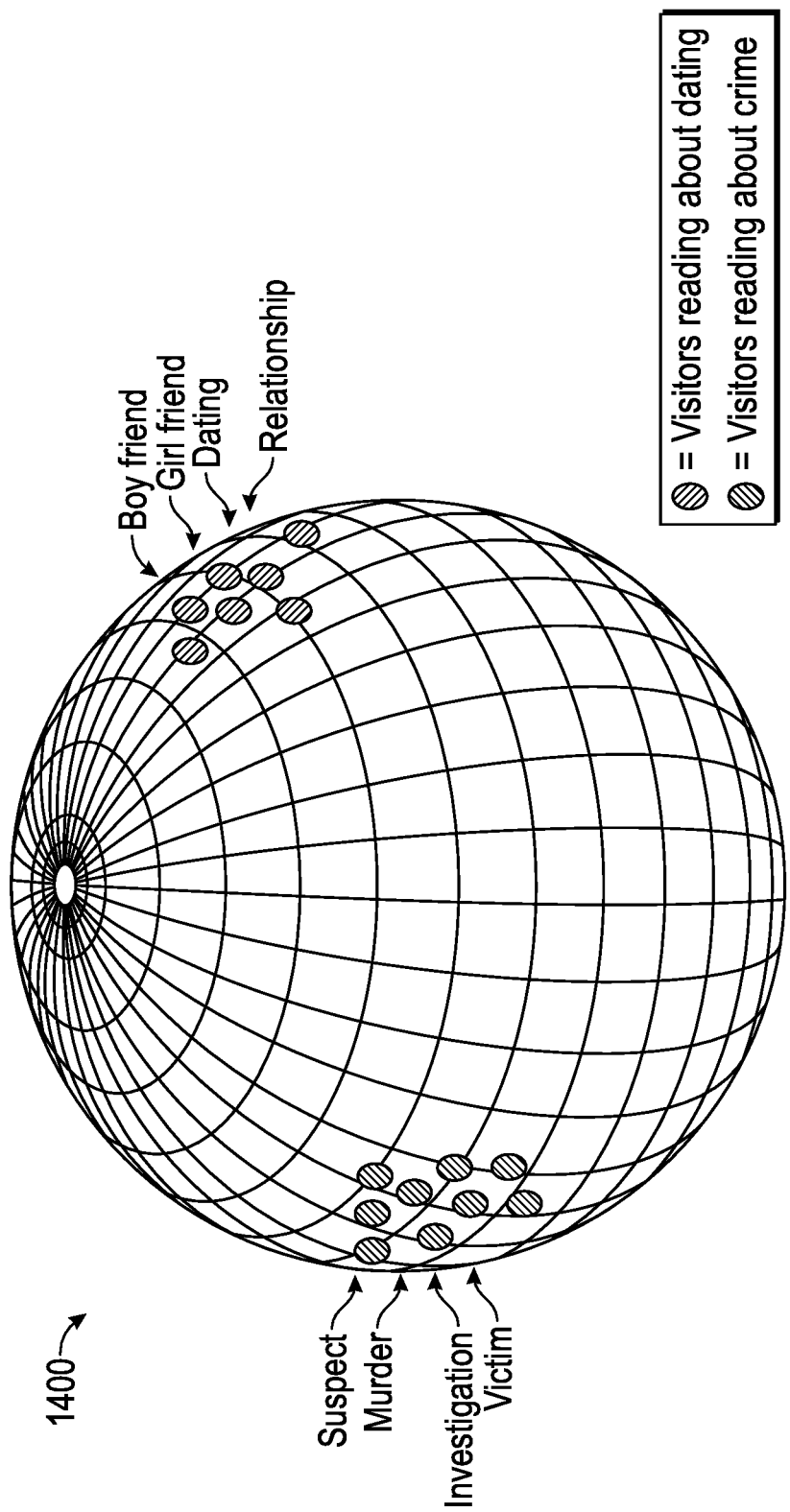
FIG. 14 is an illustration of an example of a common core sphere in accordance with embodiments of the disclosure.

FIG. 14 is an illustration 1400 of an example of a common core sphere in accordance with embodiments of the disclosure. The common core sphere may include words associated with content that may be identified on web pages consumed by users. Words that are similar to each other are positioned in close proximity to one another on the sphere. For example, because the words "crime" and "felon" are similar to each other, these words may be located in close proximity to one another on the sphere. Words that are dissimilar from each other may not be positioned in close proximity to one another on the sphere. For example, because the words "investigation" and "relationship" are dissimilar to one another, these words may not be located in close proximity to one another on the sphere. In some embodiments, the sphere visualization and use of vectors may allow the experiment system to add and subtract words (e.g., "king"–"man"="queen"). In embodiments, a user's interest score in a particular audience may be generated based on the proximity of the keyword provided by a content provider for the particular audience and the text in the user's browsing history.

As previously described, as users visit web pages, the experiment system receives browsing histories of the users and identifies content (e.g., text, images, audio) consumed by the user on the web pages. The identified content may be added together to generate a representation of each user. Each user may be represented by a point on the sphere. Users who have similar browsing histories may be located in close proximity to one another on the sphere, while users who have different browsing histories may not be located in close proximity to one another.

In embodiments, the experiment system may generate/recommend audiences based on clusters of users identified in the sphere. For example, the experiment system may identify one or more defined clusters of users of the sphere and generate audiences based on these defined clusters. The experiment system may find the centroid of each of these clusters and identify words that correspond to the centroid of the clusters. The words that are identified at the centroid may be used to define the audiences.

In some embodiments, the experiment system may perform relevance matching utilizing the sphere. Keywords for target audiences provided by a content provider may be positioned at points on the sphere based on the keywords similarity to other words positioned on the sphere. The experiment system may then identify which users on the sphere are in the closest proximity to each of these points for the target audiences and assign the users to the target audiences based on the proximity.

Figure 15:
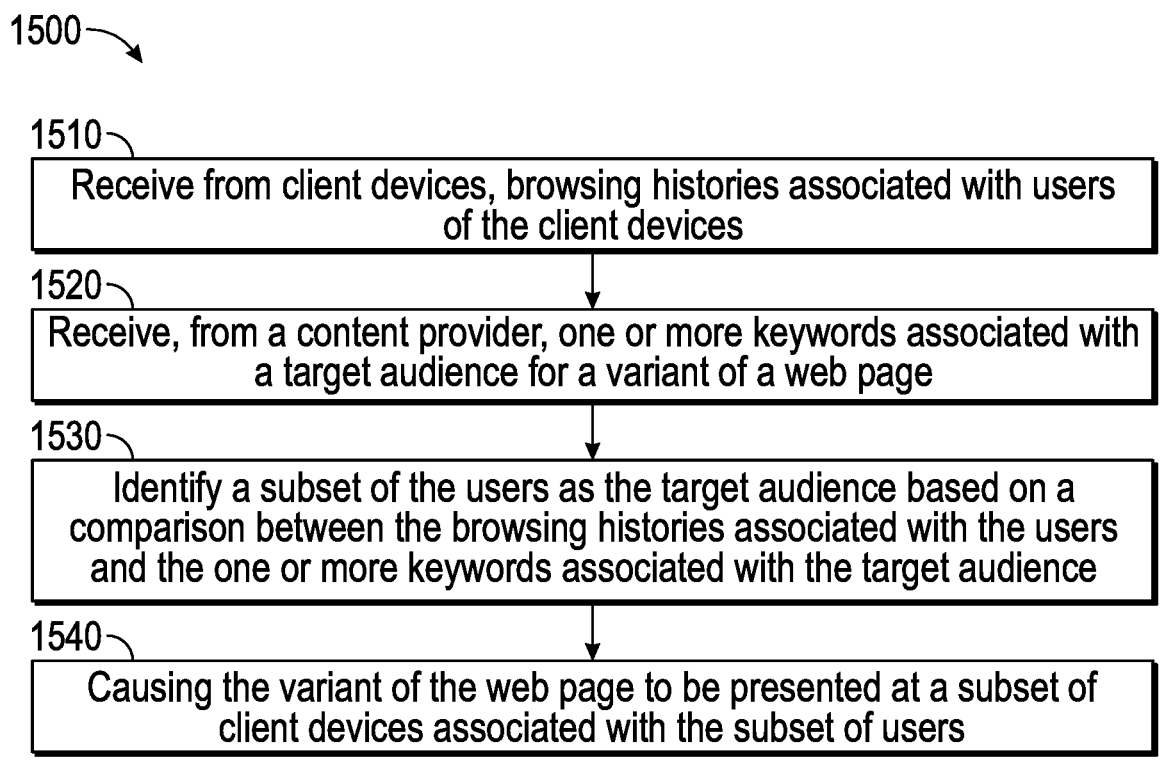
FIG. 15 is a flow diagram of a method of audience identification in multivariate testing, in accordance with some embodiments of the present disclosure.

FIG. 15 is a flow diagram of a method 1500 of audience identification in multivariate testing, in accordance with some embodiments of the present disclosure. Method 1500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 1500 may be performed by audience identification component 125 of FIG. 1.

The method 1500 begins at block 1510, in which processing logic receives, from client devices, browsing histories associated with users of the client devices. The browsing histories may include one or more web pages consumed by the users of the client devices.

At block 1520, the processing logic receives, from a content provider, one or more keywords associated with a target audience for a variant of a web page. In embodiments, the processing logic may receive one or more parameters associated with the target audience. For example, the processing logic may receive a score threshold for the target audience from the content provider.

At block 1530, the processing logic identifies a subset of the users as the target audience based on a comparison between the browsing histories associated with the users and the one or more keywords associated with the target audience. In embodiments, the subset of users may be based on an interest score determined by a machine learning algorithm executed by the processing logic, as previously described.

At block 1540, the processing logic causes the variant of the web page to be presented at a subset of client devices associated with the subset of users. In embodiments, the processing logic may cause the variant of the web page to be presented by transmitting a command to client-side agents (e.g., client-side agent 121 of FIG. 1) on the subset of client devices, where the command causes the client-side agents to present the variant of the web page.

Figure 16:
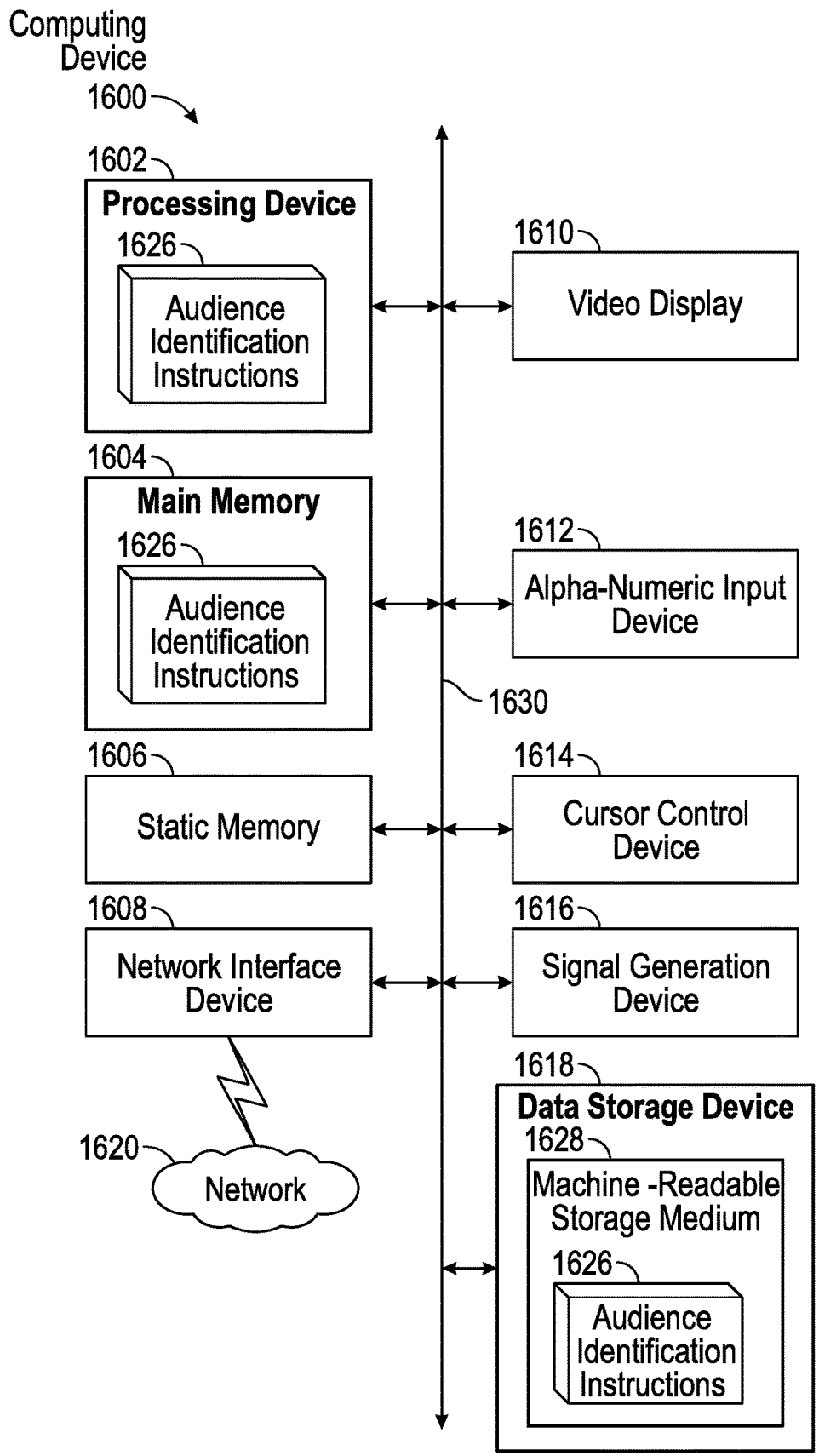
FIG. 16 is a block diagram of a computing device, in accordance with some embodiments of the present disclosure.

FIG. 16 is a block diagram of an example computing device 1600 that may perform one or more of the operations described herein, in accordance with some embodiments. In various embodiments, computing device 1600 may represent computing devices (e.g., servers) of the experimentation system, third-party content provider client devices, and/or third-party content provider servers. Computing device 1600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1600 may include a processing device (e.g., a general purpose processor, a PLD, etc.) 1602, a main memory 1604 (e.g., synchronous dynamic random access memory (DRAM), read-only memory (ROM)), a static memory 1606 (e.g., flash memory and a data storage device 1618), which may communicate with each other via a bus 1630.

Processing device 1602 may be provided by one or more general-purpose processing devices such as a microprocessor, central processing unit, or the like. In an illustrative example, processing device 1602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1602 may also comprise one or more special-purpose processing devices such as an application specific integrated circuit (ASIC), a field programmable gate array (FPGA), a digital signal processor (DSP), network processor, or the like. The processing device 1602 may be configured to execute the operations described herein, in accordance with one or more aspects of the present disclosure, for performing the operations and steps discussed herein.

Computing device 1600 may further include a network interface device 1608 which may communicate with a network 1620. The computing device 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse) and an acoustic signal generation device 1616 (e.g., a speaker). In one embodiment, video display unit 1610, alphanumeric input device 1612, and cursor control device 1614 may be combined into a single component or device (e.g., an LCD touch screen).

Data storage device 1618 may include a computer-readable storage medium 1628 on which may be stored one or more sets of instructions 1626, e.g., instructions for carrying out the operations described herein, in accordance with one or more aspects of the present disclosure. Audience identification instructions 1626 may also reside, completely or at least partially, within main memory 1604 and/or within processing device 1602 during execution thereof by computing device 1600, main memory 1604 and processing device 1602 also constituting computer-readable media. The instructions 1626 may further be transmitted or received over a network 1620 via network interface device 1608.

While computer-readable storage medium 1628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving, at an experiment system from a client device that is separate from the experiment system, a browsing history associated with a user of the client device, wherein the browsing history is generated by a client-side experimentation agent associated with a control version web page, wherein the client-side experimentation agent is provided to the client device by a content provider system to execute on the client device, and wherein the content provider system is to operate in conjunction with the experiment system to perform variation testing on the control version web page at the client device, wherein the variation testing measures performance of the control version web page against one or more modifications to the control version web page;
   receiving, at the experiment system from the content provider system, one or more keywords associated with a target audience for a first variant of the control version web page, the first variant of the control version web page comprising a first modification of positions within the control version web page of one or more items of content of the control version web page, wherein the first modification is based on the target audience, and wherein the first modification of the positions within the control version web page of the one or more items of content of the control version web page alters a first position of a first portion of the control version web page while leaving a second position of a second portion of the control version web page unchanged;
   determining, by a processing device of the experiment system, a first score for the user of the client device based on the received browsing history for the user and the one or more keywords associated with the target audience;
   comparing, by the processing device of the experiment system, the first score to a score threshold to determine whether the user is within the target audience;
   causing the first variant of the control version web page to be displayed at the client device associated with the user, wherein the client-side experimentation agent receives a command to download and apply the first modification to the positions within the control version web page of the one or more items of content of the control version web page;
   receiving a subsequent browsing history for the user;
   determining a second score for the user based on the subsequent browsing history
   determining whether the second score for the user satisfies the score threshold; and
   in response to determining that the second score for the user does not satisfy the score threshold, causing a second variant of the control version web page to be presented at the client device of the user, wherein the second variant of the control version web page comprises a second modification of the control version web page that alters the first position of the first portion of the control version web page to a third position while leaving the second position of the second portion of the control version web page unchanged.

2. The method of claim 1, further comprising:
   receiving, from the content provider system, the score threshold for the target audience.

3. The method of claim 1, further comprising:
   receiving an indication of one or more content items of a web page consumed by the user, the indication causing the one or more content items to be used to determine the first score for the user.

4. The method of claim 1, wherein the browsing history comprises one or more content items consumed by the user, the method further comprising:
   determining text associated with the one or more content items, wherein determining the text comprises at least one of identifying text presented by the one or more content items, performing image recognition on the one or more content items or performing audio recognition on the one or more content items.

5. The method of claim 4, further comprising:
   utilizing word embeddings to assign a corresponding vector having an associated directionality to each of the one or more content items, wherein each of the word embeddings represents a respective proximity of each of the one or more content items to the one or more keywords associated with the target audience.

6. A system comprising:
   a memory; and
   a processing device, operatively coupled to the memory, to:

receive, at an experiment system from a client device that is separate from the experiment system, a browsing history associated with a user of the client device, wherein the browsing history is generated by a client-side experimentation agent associated with a control version web page, wherein the client-side experimentation agent is provided to the client device by a content provider system to execute on the client device, and wherein the content provider system is to operate in conjunction with the experiment system to perform variation testing on the control version web page at the client device, wherein the variation testing measures performance of the control version web page against one or more modifications to the control version web page;

receive, at the experiment system from the content provider system, one or more keywords associated with a target audience for a first variant of the control version web page, the first variant of the control version web page comprising a first modification of positions within the control version web page of one or more items of content of the control version web page, wherein the first modification is based on the target audience, and wherein the first modification of the positions within the control version web page of the one or more items of content of the control version web page alters a first position of a first portion of the control version web page while leaving a second position of a second portion of the control version web page unchanged;

determine, at the experiment system, a first score for the user of the client device based on the received browsing history for the user and the one or more keywords associated with the target audience;

compare, at the experiment system, the first score to a score threshold to determine whether the user is within the target audience;

cause the first variant of the control version web page to be displayed at the client device associated with the user, wherein the client-side experimentation agent receives a command to download and apply the first modification to the positions within the control version web page of the one or more items of content of the control version web page;

receive a subsequent browsing history for the user;

determine a second score for the user based on the subsequent browsing history determine whether the second score for the user satisfies the score threshold; and in response to determining that the second score for the user does not satisfy the score threshold, cause a second variant of the control version web page to be presented at the client device of the user, wherein the second variant of the control version web page comprises a second modification of the control version web page that alters the first position of the first portion of the control version web page to a third position while leaving the second position of the second portion of the control version web page unchanged.

7. The system of claim 6, wherein the processing device is further to:
receive, from the content provider system, the score threshold for the target audience.

8. The system of claim 6, wherein the processing device is further to:

receive an indication of one or more content items of a web page consumed by the user, the indication causing the one or more content items to be used to determine the first score of the user.

9. The system of claim 6, wherein the browsing history comprises one or more content items consumed by the user, and
wherein the processing device is further to:
determine text associated with the one or more content items, wherein to determine the text, the processing device is to perform at least one of identifying text presented by the one or more content items, performing image recognition on the one or more content items or performing audio recognition on the one or more content items.

10. The system of claim 9, wherein the processing device is further to:
utilize word embeddings to assign a corresponding vector having an associated directionality to each of the one or more content items, wherein each of the word embeddings represents a respective proximity of each of the one or more content items to the one or more keywords associated with the target audience.

11. A non-transitory computer-readable storage medium including instructions that, when executed by a processing device, cause the processing device to:
receive, at an experiment system from a client device that is separate from the experiment system, a browsing history associated with a user of the client device, wherein the browsing history is generated by a client-side experimentation agent associated with a control version web page, wherein the client-side experimentation agent is provided to the client device by a content provider system to execute on the client device, and wherein the content provider system is to operate in conjunction with the experiment system to perform variation testing on the control version web page at the client device, wherein the variation testing measures performance of the control version web page against one or more modifications to the control version web page;

receive, at the experiment system from the content provider system, one or more keywords associated with a target audience for a first variant of the control version web page, the first variant of the control version web page comprising a first modification of positions within the control version web page of one or more items of content of the control version web page, wherein the first modification is based on the target audience, and wherein the first modification of the positions within the control version web page of the one or more items of content of the control version web page alters a first position of a first portion of the control version web page while leaving a second position of a second portion of the control version web page unchanged;

determine, at the experiment system, a first score for the user of the client device based on the received browsing history for the user and the one or more keywords associated with the target audience;

compare, by the processing device of the experiment system, the first score to a score threshold to determine whether the user is within the target audience;

cause the first variant of the control version web page to be displayed at the client device associated with the user, wherein the client-side experimentation agent receives a command to download and apply the first modification to the positions within the control version web page of the one or more items of content of the control version web page;

receive a subsequent browsing history for the user;

determine a second score for the user based on the subsequent browsing history determine whether the second score for the user satisfies the score threshold; and in response to determining that the second score for the user does not satisfy the score threshold, cause a second variant of the control version web page to be presented at the client device of the user, wherein the second variant of the control version web page comprises a second modification of the control version web page that alters the first position of the first portion of the control version web page to a third position while leaving the second position of the second portion of the control version web page unchanged.

12. The non-transitory computer-readable storage medium of claim 11, wherein the processing device is further to:

receive, from the content provider system, the score threshold for the target audience.

13. The non-transitory computer-readable storage medium of claim 11, wherein the processing device is further to:

receive an indication of one or more content items of a web page consumed by the user, the indication causing the one or more content items to be used to determine the first score for the user.

14. The non-transitory computer-readable storage medium of claim 11, wherein the browsing history comprises one or more content items consumed by the user, and wherein the processing device is further to:

determine text associated with the one or more content items, wherein to determine the text, the processing device is to perform at least one of identifying text presented by the one or more content items, performing image recognition on the one or more content items or performing audio recognition on the one or more content items.

* * * * *